United States Patent [19]

Kasari et al.

[11] Patent Number: 5,366,768
[45] Date of Patent: Nov. 22, 1994

[54] METHOD OF FORMING COATING FILMS

[75] Inventors: Akira Kasari, Hiratsuka; Satoru Ito, Kanagawa; Shigeru Nakamura, Owariasahi, all of Japan

[73] Assignee: Kansai Paint Company, Limited, Amagasaki, Japan

[21] Appl. No.: 875,271

[22] Filed: Apr. 28, 1992

[30] Foreign Application Priority Data

| May 9, 1991 | [JP] | Japan | 3-104423 |
| May 10, 1991 | [JP] | Japan | 3-105925 |
| May 13, 1991 | [JP] | Japan | 3-138491 |
| May 13, 1991 | [JP] | Japan | 3-138492 |

[51] Int. Cl.$^5$ .................................. B05D 1/36
[52] U.S. Cl. ........................... 427/407.1; 427/410
[58] Field of Search ............ 427/410, 407.1, 409, 427/386, 387

[56] References Cited

U.S. PATENT DOCUMENTS

| 4,179,537 | 12/1979 | Rykowski | 427/387 |
| 4,403,003 | 9/1983 | Backhouse | 427/407.1 |
| 4,499,150 | 2/1985 | Dowbenko et al. | 427/380 |
| 4,603,064 | 7/1986 | Kania | 427/410 |
| 4,650,718 | 3/1987 | Simpson et al. | 427/410 |
| 4,680,204 | 7/1987 | Das et al. | 427/410 |
| 4,981,728 | 1/1991 | Homma et al. | 427/407.1 |
| 5,130,167 | 7/1992 | Mitsuji et al. | 427/410 |

*Primary Examiner*—Shrive Beck
*Assistant Examiner*—D. L. Dudash
*Attorney, Agent, or Firm*—Armstrong, Westerman, Hattori, McLeland & Naughton

[57] ABSTRACT

A method for forming a coating film by sequentially forming a pigmented base coat and a clear top coat on a substrate. The pigmented base coat composition includes (1) an OH-containing resin, (2) an amino resin, (3) a polyorganosiloxane resin a number average molecule weight of at least 1,000 and having at least two groups per molecule selected from a silanol group and an alkoxysilane group and (4) a flaky metal or a mica powder in (5) an organic solvent. The clear top coat composition includes (1) an OH- and epoxy-containing base resin which additionally contains at least one of a silanol group and a hydrolyzable group bound directly to a silicon atom, (2) a curing catalyst and (3) an organic solvent.

8 Claims, No Drawings

METHOD OF FORMING COATING FILMS

The present invention relates to a novel method of forming coating films and, more particularly, to a method of forming a coating film excellent in finished appearance.

Top coats, particularly those on automotive outer body, are required to be improved almost constantly in finished appearance and coating film performance characteristics. Furthermore, the advent of low-temperature curable coating films is eagerly awaited for reducing energy costs and for insuring that an automotive outer body consisting of steel and plastic materials can be integrally coated with one and the same coating composition.

Coating compositions based on thermosetting acrylic resin/melamine resin, those based on thermosetting polyester resin/melamine resin and the like are now mainly used as coating compositions for top coat in the automobile industry. In terms of the degree of levelness and smoothness, these compositions have almost reached their limit, while there is still much room for improvement in these and other film performance characteristics. Another problem is that their low-temperature curability is not fully satisfactory. Furthermore, such problems as environmental pollution and ebullition of coating films due to condensation byproducts (formalin etc.) generated in the curing step remain to be solved.

The inventors of the present invention previously proposed an automotive coating composition excellent in low-temperature curability in a Japanese Unexamined Patent Publication No. 160879/1990. This composition is a silicone-based composition comprising a copolymer obtained by polymerizing a silanol- and/or alkoxysilane group-containing polysiloxane macromonomer and an oxirane-containing vinyl monomer, and a metal chelate compound. However, this composition has a drawback in that when it is used as both a metallic base coat composition (containing an aluminum flake pigment) and a clear top coat composition in a two-coat one-bake system, the metallic base coat is adversely affected by the clear top coat, that is to say the orientation of the aluminum flakes is disturbed, with the result that a coating film having an aluminum gloss (glitters, white reflections) cannot be obtained. When a thermosetting polyester resin/melamine resin-based coating composition is used as the metallic base coat composition, the clear top coat begins to cure before the start of curing of said metallic base coat, and this disadvantageously causes such defects as ebullition and shrinkage of the coat.

When a finish coat film has a defect, the defect is generally repaired by recoating with a metallic base coat and a clear top coat each of the same kind as before. With the silicone-based coating composition mentioned above, there remains a problem that the mutual adhesion between coating films (i.e. between top clear coat and metallic base coat for recoating) is insufficient.

It is an object of the present invention to provide a method of forming coating films excellent in finish and recoatability.

Other objects as well as features of the invention will become apparent from the description which follows.

The invention provides a method of forming coating films by forming in sequence a pigmented base coat and a clear top coat on a substrate followed by finishing by the two-coat one-bake technique, the method being characterized by using, as a coating composition for pigmented base coat formation, a composition comprising, as essential components thereof, (1) an OH-containing resin,
(2) an amino resin,
(3) a polyorganosiloxane which has, on an average, at least two groups, per molecule, each selected from the class consisting of a silanol group and an alkoxysilane group and has a number average molecular weight of at least 1,000,
(4) a flaky metal powder and/or a mica powder, and
(5) an organic solvent, and using, as a coating composition for clear top coat formation, a composition comprising, as essential components thereof, (1) an OH- and epoxy-containing base resin which further contains at least one group selected from the class consisting of a silanol group and a hydrolyzable group bound directly to a silicon atom,
(2) a curing catalyst, and
(3) an organic solvent.

The invention is now described more specifically in the following.

Pigmented Base Coat

In the coating method of this invention, the pigmented base coat is formed from a base coat composition which comprises, as essential components thereof, (1) an OH-containing resin (hereinafter sometimes referred to as "OH-containing base coat resin"), (2) an amino resin, (3) a polyorganosiloxane having, on an average, at least two groups each selected from the group consisting of a silanol group and an alkoxysilane group and having a number average molecular weight of at least 1,000 (hereinafter sometimes referred to as "polyorganosiloxane") (4) a flaky metal powder and/or a mica powder (hereinafter sometimes referred to as "metal flake" for short) and (5) an organic solvent.

Preferred as the OH-containing base coat resin are OH-containing polyester resins and OH-containing vinyl resins, among others.

The OH-containing polyester resins preferably have a hydroxyl value of about 20 to 200, more preferably about 50 to 150. When the hydroxyl value is smaller than 20, the rate of curing of the base coat film becomes slower than that of the top coat film, so that the curing of the top coat film goes ahead of that of the base coat film. As a result, the top coat film tends to develop defects such as shrinkage, leading to impairment of the appearance of the finished film. Furthermore, the curing can hardly be complete, so that the performance characteristics (e.g. water resistance, impact resistance) of the coating film will unfavorably be deteriorated. On the other hand, hydroxyl values exceeding about 200 are undesirable since, in that case, a large number of unreacted hydroxyl groups remain within the coating film, leading to deteriorated performance characteristics (e.g. water resistance, weather resistance) of the coating film.

Said OH-containing polyester resins may contain one or more carboxyl groups within the molecule. In particular, the carboxyl group can increase the rate of reaction between the hydroxyl group and the amino group, between the hydroxyl group and the silanol or alkoxysilane group, or between one silanol or alkoxysilane group and another silanol or alkoxysilane group to thereby effectively improve the finish of the coating film. Recommendably, the carboxyl group content should correspond to about 0 to 50, preferably about 5 to 20 in an acid value of resin.

As examples of the OH-containing polyester resins, there may be mentioned oil-free alkyd resins derived from at least one polybasic acid and at least one polyhydric alcohol and, if necessary, an aromatic monobasic acid; and alkyd resins derived from at least one polybasic acid and at least one polyhydric alcohol and, if necessary, an aromatic monobasic acid plus an aliphatic monobasic acid.

The polybasic acid, polyhydric alcohol, aromatic monobasic acid and aliphatic monobasic acid that are to be used in the production of said (oil-free) alkyd resins are more specifically mentioned below.

As the polybasic acid, there may be mentioned, for example, phthalic acid, isophthalic acid, terephthalic acid, tetrahydrophthalic acid, tetrahydroterephthalic acid, hexahydrophthalic acid, hexahydroisophthalic acid, hexahydroterephthalic acid, HET acid, trimellitic acid, hexahydrotrimellitic acid, pyromellitic acid, cyclohexanetetracarboxylic acid, methyltetrahydrophthalic acid, methylhexahydrophthalic acid, endomethylenehexahydrophthalic acid, methylendomethyienetetrahydrophthalic acid, maleic acid, fumaric acid, itaconic acid, succinic acid, glutaric acid, adipic acid, azelaic acid, sebacic acid, decanedicarboxylic acids suberic acid, pimelic acid, dimer acids (dimers of tall oil fatty acid), tetrachlorophthalic acid, naphthalenedicarboxylic acid, 4,4'-diphenylmethanedicarboxylic acid and 4,4'-dicarboxybiphenyl, acid anhydrides of these, and dialkyl esters of these, in particular dimethyl esters.

As the polyhydric alcohol, there may be mentioned, among others, ethylene glycol, propylene glycol, 1,4-butanediol, 1,3-butanediol, 2,3-butanediol, 1,2-butanediol, 1,5-pentanediol, 1,4-pentanediol, 2,4-pentanediol, 2,3-dimethyltrimethylene glycol, 3-methylpentane-1,5-diol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol, diethylene glycol, dipropylene glycol, triethylene glycol, neopentyl glycol, hydroxypivalic acid neopentyl glycol ester, polyalkylene oxides, bishydroxyethyl terephthalate, (hydrogenated) bisphenol A-alkylene oxide adducts, glycerol, trimethylolpropane, trimethylolethane, diglycerol, pentaerythritol, dipentaerythritol and sorbitol. Monoepoxy compounds such as Cardura E 10 (Shell Chemical Company), α-olefin epoxides and butylene oxide may also be used as a kind of glycol.

Furthermore, compounds containing both carboxyl and hydroxyl groups within the molecule may also be used. As such compounds, there may be mentioned, for example, dimethylolpropionic acid, pivalic acid, 12-hydroxystearic acid and ricinolic acid. Lactones such as ε-caprolactone and c-valerolactone also fall under the category of the compounds mentioned above since they are cyclic ester compounds.

The aromatic monobasic acid includes, among others, benzoic acid and p-tert-butylbenzoic acid.

The aliphatic monobasic acid includes, among others, caproic acid, captic acid, lauric acid, myristic acid, palmitic acid, stearic acid, isononanoic acid and coconut oil (fatty acids).

The (oil-free) alkyd resins mentioned above can be produced by any of the conventional methods, for example by subjecting a mixture of the above-mentioned polybasic acid and polyhydric alcohol and, if necessary, monobasic acid to esterification or transesterification in the presence of an esterification catalyst (e.g. dibutyltin dilaurate). Said polybasic acid and polyhydric alcohol are desirably used in proportions such that the number of moles of the polybasic acid component(s) is within the range of about 0.7 to 0.99, preferably about 0.8 to 0.98, per mole of the polyhydric alcohol component(s). The esterification catalyst is desirably used in an amount of about 0.1 to 1.0 part by weight, preferably about 0.2 to 0.5 part by weight, per 100 parts by weight of the sum total of the polyhydric alcohol and polybasic acid components. As for the reaction conditions, the reaction temperature is generally about 160° to 280° C., preferably about 180° to 260° C., and the reaction period is generally about 5 to 12 hours, preferably about 6 to 8 hours.

As the OH-containing polyester resin, vinyl-modified alkyd resins, for instance, may also be used. Usable as said vinyl-modified alkyd resins are, for example, reaction products from an OH-containing (oil-free) alkyd resin and a COOH- or NCO-containing vinyl resin, reaction products from an OH- and COOH-containing (oil-free) alkyd resin and an epoxy-containing vinyl resin, products of radical polymerization of a vinyl monomer [e.g. a polymerizable unsaturated monomer (b) mentioned below] in the presence of an (oil-free) alkyd resin having a radical-polymerizable unsaturated group (e.g. an alkyd resin containing a drying oil as an essential component, an alkyd resin derived from an OH- and COOH-containing (oil-free) alkyd resin by reaction with glycidyl (meth)acrylate), and products of polymerization of a vinyl monomer (e.g. a polymerizable unsaturated monomer (b) mentioned below) in the presence of an (oil-free) alkyd resin or vinyl-modified alkyd resin such as mentioned above, for instance, as a suspension stabilizer, in an organic solvent in which said monomer and suspension stabilizer can be dissolved but the polymer particles obtained from said monomer will not be dissolved.

The molecular weight of the OH-containing polyester resin, as expressed in terms of number average molecular weight, can be within the range of about 500 to 10,000 in the case of an (oil-free) alkyd resin, or within the range of about 2,000 to 80,000 in the case of a vinyl-modified alkyd resin. When said molecular weight is below the above range, the melt viscosity of the base coat decreases during baking, whereby the orientation of metal flakes changes, making it difficult to obtain coating films with a metallic tone. A molecular weight exceeding the above range is also undesirable since the workability in coating generally decreases.

The OH-containing vinyl resins should preferably have a hydroxyl value of about 20 to 200, more preferably about 50 to 150. When the hydroxyl value is below 20, the rate of curing of the base coat film becomes slower than that of the top coat film, so that the curing of the top coat film precedes the curing of the base coat film. As a result, the top coat film tends to develop defects such as shrinkage, causing the finished coating film to have an impaired appearance. Furthermore, the curing can hardly be complete, so that the performance characteristics (e.g. water resistance, impact resistance) of the coating film will unfavorably be deteriorated. Hydroxyl values higher than about 200 are also undesirable since, in that case, a large number of unreacted hydroxyl groups remain in the coating film, leading to deteriorated performance characteristics (e.g. water resistance, weather resistance) of the coating film.

Said OH-containing vinyl resins may contain one or more carboxyl groups within the molecule. In particular, the carboxyl group can increase the rate of reaction between the hydroxyl group and the amino group, between the hydroxyl group and the silanol or alkoxysilane group, and between one silanol or alkoxysilane group and another silanol or alkoxysilane group, to thereby effectively improve the finish of the coating film. The carboxyl group content should recommendably correspond to about 0 to 50, preferably about 5 to 20 in an acid value of resin.

Usable as the OH-containing vinyl resins are, for example, (co)polymers obtained by radical polymerization of at least one of the OH-containing polymerizable unsaturated monomers (a) mentioned below, optionally together with at least one of other polymerizable unsaturated monomers (b) mentioned below.

As said OH-containing polymerizable unsaturated monomers (a), there may be mentioned, for example, the following (a-1) to (a-5).

(a-1) Hydroxyalkyl vinyl ethers, such as hydroxybutyl vinyl ether;
(a-2) Allyl alcohol and methallyl alcohol;
(a-3) (Meth)acrylic acid hydroxyalkyl esters, such as hydroxyethyl (meth)acrylate, hydroxypropyl (meth)acrylate, and hydroxybutyl (meth)acrylate;
(a-4) (Poly)alkylene glycol monoacrylates, such as ethylene glycol monoacrylate, and polyethylene glycol monoacrylate;
(a-5) Adducts of (a-1) to (a-4) with a lactone (e.g. ε-caprolactone, c-valerolactone).

As other polymerizable unsaturated monomers (b), there may be mentioned, for example, $C_{1-24}$ alkyl or cycloalkyl esters of (meth)acrylic acid, such as methyl (meth)acrylate, ethyl (meth)acrylate, butyl (meth)acrylate, hexyl (meth)acrylate, octyl (meth)acrylate, lauryl (meth)acrylate and cyclohexyl (meth)acrylate; COOH-containing compounds such as (meth)acrylic acid, crotonic acid, itaconic acid, maleic acid (anhydride), fumaric acid and 2-carboxyethyl (meth)acrylate; aromatic vinyl compounds such as styrene and vinyltoluene; perfluoroalkyl (meth)acrylates such as perfluorobutylethyl (meth)acrylate, perfluoroisononylethyl (meth)acrylate and perfluorooctylethyl (meth)acrylate; (meth)acrylonitrile; olefins; fluoroolefins; vinyl esters; cyclohexyl or alkyl vinyl ethers; and allyl ethers.

Said OH-containing vinyl resins can be produced in the conventional manner, for example by subjecting the above monomer or monomers (a), optionally together with one or more other monomers (b), to polymerization in a substantially inert organic solvent in the presence of a radical polymerization initiator at about 80° to 220° C. for about 4 to 18 hours.

As the organic solvent, there may be mentioned, for example, aromatic hydrocarbons such as xylene and toluene; esters such as ethyl acetate, propyl acetate and butyl acetate; ketones such as acetone and methyl ethyl ketone; and ethers such as ethylene glycol, cellosolve, butylcellosolve and cellosolve acetate. Such organic solvents may be used either singly or as a mixture of two or more of them.

Radical polymerization initiators which can be used include, among others, azo type initiators such as 2,2'-azobisisobutyronitrile and 2,2'-azobis(2,4-dimethylvaleronitrile), and peroxide type initiators such as benzoyl peroxide, lauryl peroxide and tert-butyl peroctoate. The OH-containing vinyl resins may have a number average molecular weight of about 2,000 to 80,000, preferably about 4,000 to 20,000. When the molecular weight is smaller than about 2,000, the melt viscosity of the base coat decreases excessively during baking, allowing the orientation of metal flakes to change. As a result, coating films with a metallic tone can hardly be obtained. Molecular weights higher than about 80,000 are also undesirable since the workability in coating decreases.

The amino resin is used as a crosslinking agent and includes methylol amino resins obtained by reacting an aldehyde with an amino component such as melamine, urea, benzoguanamine, acetoguanamine, stearoguanamine, spiroguanamine or dicyandiamide. The aldehyde is, for example, formaldehyde, paraformaldehyde, acetaldehyde, or benzaldehyde. Products of etherification of these methylol amino resins with an alcohol may also be used. Examples of the alcohol to be used for etherification are methyl alcohol, ethyl alcohol, n-propyl alcohol, isopropyl alcohol, n-butyl alcohol, isobutyl alcohol, 2-ethylbutanol and 2-ethylhexanol, among others. Highly etherified melamine resins, namely melamine resins having, on an average, at least three methyl ether moieties per triazine ring or melamine resins derived therefrom by partial transetherification of the methoxy groups with an alcohol containing 2 or more carbon atoms, can be used as said amino resins. Among these, low-molecular-weight melamines having an average condensation degree of not more than 2 with single nucleus forms accounting for at least 50% by weight are preferred since high solids contents of the base coat composition can be attained with them. When such melamines are used, a conventional curing catalyst such as p-toluenesulfonic acid should preferably be added.

The polyorganosiloxane is used as a crosslinking agent for the OH-containing base coat resin, like the amino resin mentioned above, and further as a self-curing resin, and contains, on an average, at least two groups, preferably 2 to 10 groups, per molecule, each selected from among silanol and alkoxysilane groups. It suitably has a number average molecular weight of not less than 1,000, preferably 1,000 to 50,000. The incorporation of a polyorganosiloxane leads to improved curability of the interface layer (mixed layer) between the pigmented base coat and the clear top coat, whereby such coating film performance characteristics as finish appearance and solvent resistance can be improved. The polyorganosiloxane preferably contains a ladder structure portion and can be prepared, for example by subjecting a silane compound essentially comprising a trifunctional silane of the general formula $$R^1_x Si(OR^2)_{4-x} \qquad (I)$$

wherein $R^1$ and $R^2$ may be the same or different and each is a hydrocarbon group containing 1 to 13 carbon atoms and x is 1, to hydrolysis condensation.

As the $R^1$ and $R^2$ groups mentioned above, there may be mentioned, for example, methyl, ethyl, propyl, butyl and phenyl.

The silane compound to be subjected to hydrolysis condensation may be composed of a trifunctional silane formula (I) alone or may contain, in addition to the trifunctional silane, a bifunctional or monofunctional silane in which x in formula (I) has a value of 2 or 3, respectively, or both. In said silane compound, the content of the trifunctional silane of formula (I) should preferably be not less than 30% by weight, more preferably not less than 80% by weight.

As typical examples of the trifunctional silane formula (I), there may be mentioned methyltrimethoxysilane, methyltriethoxysilane, phenyltrimethoxysilane, phenyltriethoxysilane, isobutyltrimethoxysilane, isobutyltriethoxysilane and ethyltrimethoxysilane. As the bifunctional or monofunctional silane which can be used in admixture with the trifunctional silane of formula (I), there may be mentioned, for example, dimethyldimethoxysilane, diphenyldimethoxysilane, diphenyldiethoxysilane, diisobutyldimethoxysilane, diisobutyldipropoxysilane and trimethylmethoxysilane.

In the practice of the invention, the polyorgano-siloxane should preferably contain, on an average, not only at least two groups per molecule each selected from among silanol and alkoxysilane groups but also at least one epoxy group, preferably 1 to 30 epoxy groups, per molecule. By using an epoxy-containing polyorganosiloxane, the curability of the mixed layer can be further improved to give coating films very excellent in finish appearance, solvent resistance and so forth.

The epoxy-containing polyorganosiloxane can be prepared by subjecting to hydrolysis cocondensation a silane representable by the general formula (I) wherein x is 1, 2 or 3 and an epoxy-containing silane of the general formula

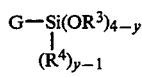  (II)

wherein $R^3$ and $R^4$ may be the same or different and each is a hydrocarbon group containing 1 to 13 carbon atoms, y is 1, 2 or 3, G is a group of the formula (III) or (IV) given below.

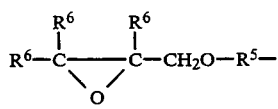  (III)

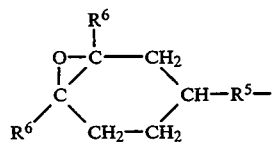  (IV)

In the above formulas (III) and (IV), $R^5$ is a bivalent hydrocarbon group containing 1 to 13 carbon atoms and the $R^6$ groups may be the same or different and each is a hydrogen atom or a methyl group.

As the $R^3$ and $R^4$ groups mentioned above, there may be mentioned, for example, methyl, ethyl, propyl, butyl and phenyl. As the $R^5$ group, there may be mentioned, for example, methylene, ethylene, propylene, butylene and hexamethylene.

The proportions of the silane of formula (I) in which X is 1, 2 or 3 and the silane of formula (II) to be subjected to cocondensation are not: critical but, generally, the silane (I):silane (II) weight ratio is within the range of 95:5 to 10:90. It is preferable that, among the silane species to be charged, the silane of formula (I) in which x is 1 and the silane of formula (II) in which y is 1 combinedly account for not less than 30% by weight, more preferably not less than 80% by weight.

Typical examples of the silane of formula (I) which is to be used for cocondensation with the epoxy-containing silane of general formula (II) include, in addition to the above-mentioned silanes in which x is 1, silanes in which x is 2 or 3, such as dimethyldimethoxysilane, diphenyldimethoxysilane, diphenyldiethoxysiiane, diisobutyldimethoxysilane, diisobutyldipropoxysilane and trimethylmethoxysilane.

Typical examples of the silane of formula (II) are c-glycidoxypropyltrimethoxysilane, c-glycidoxypropyltriethoxysilane, b-(3,4-epoxycyclohexyl)ethyitrimethoxysilane and b-(3,4-epoxycyclohexyl)ethyltriethoxysilane.

The hydrolysis condensation or cocondensation of the silane compounds mentioned above is carried out by mixing the silane compound(s) with a water-soluble solvent (e.g. alcohol type or cellosolve type solvent) as necessary and allowing the hydrolysis and condensation reactions to proceed in the presence of an inorganic acid such as hydrochloric acid, sulfuric acid or phosphoric acid or an organic acid such as formic acid or acetic acid and in the presence of water, preferably at a pH of not more than 6, at a temperature of about 20° to 100° C. with stirring for about 30 minutes to 20 hours.

The molecular weight of the polyorganosiloxane can suitably be controlled by adjusting or selecting the amount of water, the kind and amount of catalyst, the reaction temperature and the reaction time, among others.

When, in the above-mentioned polyorganosiloxane, the average number of silanol and/or alkoxysilane groups per molecule is below 2, the rate of curing of the base coat film becomes slower than that of the top coat film and the curing of the top coat film begins before curing of the base coat film, so that the top coat film develops deffects such as shrinkage and the finished coating film presents an unsatisfactory appearance.

When the polyorganosiloxane resin has a number average molecular weight of less than 1,000, the melt viscosity of the base coat becomes excessively low during baking and, as a result, the orientation of metal flakes is disturbed, so that coating films with a metallic tone can hardly be obtained.

In the base coat composition, the proportions of the OH-containing base coat resin, amino resin and polyorganosiloxane, which are to serve as binders, based on the total amount (resin solids content) of said three components, are recommendably as follows: OH-containing base coat resin 5 to 90% by weight, preferably 30 to 60% by weight, amino resin 5 to 50% by weight, preferably 10 to 40% by weight, and polyorganosiloxane 1 to 40% by weight, preferably 5 to 30% by weight, more preferably 5 to 20% by weight.

When the OH-containing base coat resin is used in an amount of less than 5% by weight, the adhesion to substrates becomes insufficient, while, when said amount is above 90% by weight, the appearance and performance characteristics (e.g. water resistance, processability) of the finished coating film become unsatisfactory. When the proportion of the amino resin is below 5% by weight, the crosslink density of the OH-containing resin becomes low and the water resistance and impact resistance become markedly poor. When said proportion exceeds 50% by weight, the mechanical characteristics and the adhesion to substrates are compromised. When the proportion of the polyorganosiloxane is below 1% by weight, the accelerating effect on the rate of curing of the base coat film is slight, hence the finished coating film cannot be improved in appearance, whereas, when said proportion exceeds 40% by weight, the adhesion to substrates becomes unsatisfactory.

The metal flakes are used to give a metallic tone to coating films. As the flaky metal, there may be mentioned, for example, aluminum flakes, nickel flakes, copper flakes, brass flakes and chromium flakes. As the mica powder, there may be mentioned pearl mica and pigmented pearl mica, among others.

In the base coat composition, metal flakes are incorporated in an amount of about 1 to 20 parts by weight per 100 parts by weight of resin solids.

As examples of the organic solvent, there may be mentioned aromatic hydrocarbons such as xylene and toluene, esters such as ethyl acetate, propyl acetate and butyl acetate, ketones such as acetone and methyl ethyl ketone, and ethers such as ethylene glycol, cellosolve, butylcellosolve and cellosolve acetate. Such organic solvents may be used either singly or in the form of a mixture of two or more of them. From the standpoint of finishing performance, the boiling point should preferably be not higher than about 150° C. but this is not critical.

Other additives for coating composition than those mentioned above which can be incorporated in the base coat composition as necessary include organic pigments, inorganic pigments, pigment dispersing agents, finely divided polymers, ultraviolet absorbers, painted surface modifiers, curing catalysts, cellulose acetate (and derivatives thereof), etc.

As pigments which may be incorporated in said coating composition, there may be mentioned, for example, organic pigments (e.g. quinacridone pigments such as quinacridone red, azo pigments such as pigment red, phthalocyanine pigments such as phthalocyanine blue and phthalocyanine green), inorganic pigments (e.g. titanium oxide, barium sulfate, calcium carbonate, baryta, clay, silica), and carbon-based pigments (e.g. carbon black).

The base coat composition to be used in the practice of the invention generally has a resin solids content of about 10 to 50% by weight.

Clear Top Coat

The top coat is formed from a clear coating composition (top coat composition) comprising, as essential components thereof, (1) an OH- and epoxy-containing base resin (hereinafter referred to as "top coat base resin") which further contains one or more groups each selected from the group consisting of a silanol group and a hydrolyzable group bound directly to a silicon atom, (2) a curing catalyst and (3) an organic solvent.

The hydrolyzable group in the above top coat base resin is a group capable of undergoing hydrolysis in the presence of water to form a silanol group together with the silicon atom. Said group includes, among others, $C_{1-5}$ alkoxy groups; aryloxy groups such as phenoxy, tolyloxy, p-methoxyphenoxy, p-nitrophenoxy and benzyloxy; acyloxy groups such as acetoxy, propionyloxy, butanoyloxy, benzoyloxy, phenylacetoxy and formyloxy; and residues of the formula $-N(R^7)_2$, $-ON(R^7)_2$, $-ON=C(R^7)_2$ or $-NR^8COR^7$ (in which the $R^7$ groups are the same or different and each is $C_{1-8}$ alkyl, aryl or aralkyl and $R^8$ is H or $C_{1-8}$ alkyl).

As the top coat base resin, there may be mentioned, for example, (1) a resin mixture (hereinafter referred to as "resin (1)") comprising the following three components: an OH-containing resin (A), an epoxy-containing resin (B) and a resin (C) containing one or more groups each selected from the group consisting of a silanol group and a hydrolyzable group bound directly to a silicon atom, (2) a resin mixture (hereinafter referred to as "resin (2)") comprising the following two components: an epoxy-containing resin (B) and a resin (C) containing one or more groups each selected from the group consisting of a silanol group and a hydrolyzable group bound directly to a silicon atom, at least one of resin (B) and resin (C) being an OH-containing resin, and (3) an OH- and epoxy-containing resin (hereinafter referred to as "resin (3)") which further contains one or more groups each selected from the group consisting of a silanol group and a hydrolyzable group bound directly to a silicon atom.

Resin (1)

Resins usable as the OH-containing resin (A) have, on an average, at least two hydroxyl groups per molecule and preferably have a number average molecular weight of 1,000 to 200,000, more preferably 3,000 to 80,000. When the average number of hydroxyl groups is below 2, the curability (gel fraction) will unfavorably be poor. From the standpoint of finishing performance, water resistance and other viewpoints, the average number of hydroxyl groups should preferably be not more than 400. When the number average molecular weight is below 1,000, the mechanical properties, finishing performance, water resistance will be inferior. Resins having a number average molecular weight above 200,000 are undesirable since they are less compatible with other components, hence cause non-uniform curing and give a poor finish.

Known OH-containing resins can be used as the OH-containing resin (A). However, vinyl polymers are preferred particularly from the water resistance and finish viewpoints, among others. Said OH-containing resin (A) may be prepared, for example by subjecting the OH-containing polymerizable unsaturated monomer (a) mentioned above, when necessary together with the above-mentioned other polymerizable unsaturated monomer (b), to polymerization in the same manner as mentioned above.

The epoxy-containing resin (B) has, on an average, 2 to 300 epoxy groups per molecule and preferably has a number average molecular weight of 120 to 200,000, more preferably 240 to 80,000. When the number of epoxy groups is smaller than 2, the curability, finishing performance and impact resistance will be unsatisfactory. Compounds having a number average molecular weight smaller than 120 are difficult to prepare. Compounds having a number average molecular weight higher than 200,000 are poor in compatibility with other components and, as a result, unfavorably give coating films with low weather resistance and poor finish, for instance.

Preferred as the epoxy-containing resin (B) are alicyclic polyepoxide crosslinking agents (e.g.

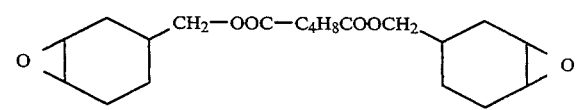

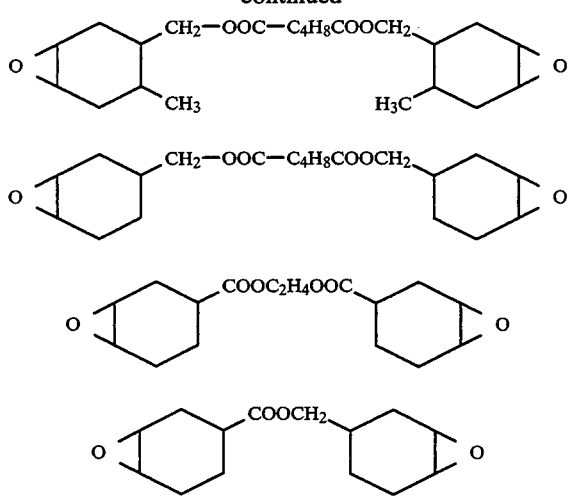

etc.), homopolymers of an oxirane-containing polymerizable unsaturated monomer (c) e.g. an alicyclic vinyl monomer of the general formula (4) to (18) as described in Japanese Unexamined Patent Publication No. 160879/1990 and copolymers of such monomer (c) with the other polymerizable unsaturated monomer or monomers (b) mentioned above.

Preferred examples of the resin (C) containing one or more groups each selected from the group consisting of a silanol group and a hydrolyzable group bound directly to a silicon atom include, among others, homopolymers of a silane compound (d-1) such as c-(meth)acryloxypropyltrimethoxysilane, c-(meth)acrytoxypropyltriethoxysilane, c-(meth)acryloxypropyltrisilanoi, c-(meth)acryloxypropylmethyldimethoxysilane, vinyltrimethoxysilane, vinyltriethoxysilane, 2-styryiethyltrimethoxysilane or allyltriethoxysilane; homopolymers of a reaction product (d-2) from said silane compound (d-1) and a trialkoxy- or trihydroxysilane compound (e.g. methyltrimethoxysilane, phenyltrimethoxysilane, methyltrisilanol), for example a polysiloxane macromonomer described in Japanese Unexamined Patent Publication No. 160879/1990; and copolymers of such silane compound (d-1) and/or such reaction product (d-2) with the other polymerizable unsaturated monomer or monomers (b).

From the curability and coating film finish viewpoints, among others, the proportions of the above resins (A), (B) and (C) based on the total amount of these three components should preferably be as follows: resin (A) 5 to 95% by weight, more preferably 20 to 80% by weight, resin (B) 95 to 5% by weight, more preferably 80 to 20% by weight, and resin (C) 0.1 to 80% by weight, more preferably 1 to 20% by weight.

Resin (2)

The epoxy-containing resin (B) and the silanol- and/or Si-bound hydrolyzable group-containing resin (C) may be the same as those mentioned above.

In resin (2), at least one of resins (B) and (C) is an OH-containing one. Hydroxy groups can be introduced into said resin (B) and/or (C), for example by using the abovementioned OH-containing polymerizable unsaturated monomer or monomers (a) as essential components of resin (B) and/or (C). In this case, the average number of hydroxyl groups is suitably not less than 1, preferably not more than 400, per molecule. The number average molecular weight of each resin is desirably 1,000 to 200,000, preferably 3,000 to 80,000.

The proportions of the above resins (B) and (C) that are preferred from the curability, coating film finish and other viewpoints are, based on the total amount of these two components, as follows: resin (B) 5 to 95% by weight, more preferably 20 to 80% by weight, and resin (C) 95 to 5% by weight, more preferably 80 to 20% by weight.

The above-mentioned OH-containing resin (A) may be incorporated in the resin (2).

Resin (3)

From the curability, coating film finish and other viewpoints, said resin (3) should preferably have, on an average, at least one, preferably 2 to 40 silanol and/or Si-bound hydrolyzable groups, per molecule, at least one, preferably 2 to 40 epoxy groups, per molecule, and 2 to 200 hydroxyl groups per molecule.

Preferred as the resin (3) are copolymers of the above-mentioned OH-containing polymerizable unsaturated monomer or monomers (a), the above-mentioned oxirane-containing polymerizable unsaturated monomer or monomers (c), the above-mentioned silane compound (d-1) and/or reaction product (d-2) and, when necessary, the other polymerizable unsaturated monomer or monomers (b).

The proportions of said monomers (a) to (d-2) may be adjusted so that the functional group contents in the resin can fall within the respective ranges mentioned above.

The resin (3) desirably has a number average molecular weight of 1,000 to 200,000, preferably 3,000 to 80,000.

The above-mentioned OH-containing resin (A) may be incorporated in the resin (3) as necessary.

The above-mentioned top coat base resin is used in the form of a solution, dispersion or nonaqueous dispersion, for example in a hydrocarbon solvent such as toluene or xylene, a ketone solvent such as methyl ethyl ketone or methyl isobutyl ketone, an ester solvent such as ethyl acetate or butyl acetate, an ether solvent such as dioxane or ethylene glycol diethyl ether, an alcohol solvent such as butanol or propanol or an aliphatic hydrocarbon such as pentane, hexane or heptane.

The nonaqueous dispersion type top coat base resin composition can be produced by polymerizing, in the presence of the above-mentioned resin (1), (2) or (3) as a dispersion stabilizer, one or more radical-polymerizable unsaturated monomers in the presence of a polymerization initiator in an organic solvent in which said monomers and dispersion stabilizer are soluble but polymer particles or grains produced from the monomers are insoluble. When the resin to be used as a dispersion stabilizer is a mixture, namely when the resin (1) or (2) is used, a part or the whole of the components of the resin mixture may be used as a dispersion stabilizer in polymerizing the monomers and, when a part of the components of the resin mixture is used, the remaining portion thereof is then added to the polymerization mixture. All the monomers already described hereinabove may be mentioned as monomers that can be used for forming polymers as particle component in the nonaqueous dispersion. The polymers as particle component should not be dissolved in the organic solvent employed and therefore should preferably be copolymers rich in a highly polar monomer or monomers such as methyl (meth)acrylate, ethyl (meth)acrylate, (meth-)acrylonitrile, 2-hydroxyethyl (meth)acrylate, hydroxypropyl (meth)acrylate, (meth)acrylamide, acrylic acid, methacrylic acid, itaconic acid, styrene, vinyltoluene, α-methylstyrene and N-methylol(meth)acrylamide. When necessary, particles in the nonaqueous dispersion may be crosslinked prior to formulating the top coat composition. The use of a polyfunctional monomer such as divinylbenzene or ethylene glycol dimethacrylate for copolymerization is an example of the method of enabling crosslinking within said particles.

The organic solvent to be used in the nonaqueous dispersion includes those solvents in which dispersed polymer particles formed by the polymerization are substantially insoluble and which serve as good solvents for the above-mentioned dispersion stabilizer and radical-polymerizable monomers. Preferred solvents generally comprise an aliphatic hydrocarbon as a main component, suitably combined with an aromatic hydrocarbon or such an alcohol, ether, ester or ketone solvent as mentioned above. Trichlorotrifluoroethane, metaxylene hexafluoride, tetrachlorohexafluorobutane or the like may further be used when necessary.

The above-mentioned monomers are polymerized using a radical polymerization initiator. As examples of the radical polymerization initiator that can be used, there may be mentioned azo type initiators such as 2,2'-azobisisobutyronitrile and 2,2'-azobis(2,4-dimethylvaleronitrile), and peroxide type initiators such as benzoyl peroxide, lauryl peroxide and tert-butyl peroctoate. These polymerization initiators can be used generally in an amount of 0.2 to 10 parts by weight per 100 parts by weight of the monomers submitted to polymerization. The amount of the dispersion stabilizer resin in the above polymerization may be selected within a wide range depending on the kind of said resin. Generally, however, the radical-polymerizable unsaturated monomers are used in an amount of about 3 to 240 parts by weight, preferably about 5 to 82 parts by weight, per 3.00 parts by weight of said resin.

In the practice of the invention, it is also possible to bind the dispersion stabilizer resin to polymer particles.

The above-mentioned resin composition of the nonaqueous dispersion type is a nonaqueous dispersion consisting of a liquid phase, namely a solution of the dispersion stabilizer resin in the organic solvent, and a solid phase composed of polymer particles produced by polymerization of the radical-polymerizable unsaturated monomers and stably dispersed in said liquid phase, and said composition can markedly increase the solids content in coating and the viscosity after coating as well to give coating films excellent in finish appearance without sagging or running. Furthermore, the coating films formed have organosilane groups in the continuous phase thereof and are stable against light and chemical attacks. In addition, the polymer particles in said coating films are stabilized by said continuous phase and the coating films are reinforced by the particle component, so that the coating films have excellent mechanical characteristics, for example very good impact resistance.

In the clear coating composition for the top coat, the curing catalyst is used to promote the reaction of silane, epoxy and hydroxyl groups in the resin(s) and includes, as suitable examples, metal alkoxides in which the metal is, for instance, aluminum, titanium, zirconium, calcium or barium; metal chelate compounds composed of such metal alkoxides as mentioned above and a chelating compound (ligand) capable of taking the keto-enol tautomeric forms; Lewis acids such as $AlCl_3$, $Al(C_2H_5)_2Cl$, $TiCl_4$, $ZrCl_4$, $SnCl_4$, $FeCl_4$, $BF_3$ and $BF_3:(OC_2H_5)_2$; protonic acids inclusive of organic protonic acids (e.g. methanesulfonic acid, benzenesulfonic acid, p-toluenesulfonic acid, etc.) and inorganic protonic acids (e.g. phosphoric acid, phosphorous phorous acid, phosphinic acid, sulfuric acid, etc.); and compounds containing the Si-O-Al bond, such as aluminum silicate. Among the compounds mentioned above, metal chelate compounds are preferred and, in particular, aluminum chelate compounds such as diisopropoxy(ethyl acetoacetato)aluminum, tris(ethyl acetoacetato)aluminum, isopropoxybis-(ethyl acetoacetato)aluminum, monoacetylacetonatobis (ethyl acetoacetato) aluminum, tris (n-propyl acetoacetato) aluminum, tris (n-butyl acetoacetato) aluminum, mono (ethyl acetoacetato)bis (acetylacetonato)aluminum, tris (acetylacetonato) aluminum, tris (propionylacetonato) aluminum and acetylacetonatobis (propionylacetonato) aluminum, titanium chelate compounds such as diisopropoxybis (ethyl acetoacetato) titanium and diisopropoxybis (acetylacetonato)titanium, and zirconium chelate compounds such as tetrakis(n-propyl acetoacetato)zirconium, tetrakis (acetylacetonato) zirconium and tetrakis (ethyl acetoacetato) zirconium are suitable.

The curing catalyst is used in an amount of 0.01 to 30 parts by weight, preferably 0.1 to 10 parts by weight, per 100 parts by weight of the top coat base resin mentioned above. When the catalyst is used in an amount below 0.01 part by weight, the curability and finish of the coating film are compromised whereas, when it is used in an amount exceeding 30 parts by weight, the finish and water resistance of the coating film are unfavorably compromised.

The clear coating composition may contain, as necessary, ultraviolet absorbers, antioxidants, light stabilizers and various other additives for coating composition.

The clear coating composition to be used in the practice of the invention should generally have a resin solids content of about 25 to 80% by weight.

The method of this invention can be practiced by applying the pigmented base coat composition to a substrate such as a coated surface prepared by electrodeposition coating of a steel sheet (after chemical conversion treatment) followed by or without a subsequent intercoating, or a coated surface prepared by applying a primer to any of various plastic materials with or without subsequent intercoating, and then applying the top clear coat composition. The electrodeposition coating composition and the intercoating composition are baked generally at 140° to 190° C. for 30 to 90 minutes, although the baking conditions may vary depending on the composition types. The pigmented base coat composition and top clear coat composition can be applied in the conventional manner, for example using an electrostatic or non-electrostatic coating machine or equipment. The thickness of the pigmented base coat film is preferably about 10 to 50 μm (after curing). After application of base coat composition, the coating film is dried by allowing to stand at room temperature for several minutes or by forced drying at about 50° to 80° C. for several minutes, and then the clear coat composition is applied. The clear coat film preferably has a thickness of 20 to 100 μm (after curing). The coated material is heated at about 120° to 180° C. for about 30 to 90 minutes, whereby curing can be attained.

In the method of this invention, the pigmented base coat composition to be finished by the two-coat one-bake technique contains, as a binder component, a polyorganosiloxane having at least two groups, per molecule, which are each selected from the class consisting of silanol group and an alkoxysilane group, so that, upon heating, the reaction between silanol groups (inclusive of silanol groups resulting from hydrolysis of alkoxysilane groups) and the reaction of a silanol group, an amino group in the amino resin and a hydroxyl group in the OH-containing resin occur rapidly at relatively low temperatures. Said reactions proceed faster than the curing reaction of the clear coating composition, so that, in the early stage of baking, the viscosity of the base coat composition increases more rapidly than that of the clear coating composition. It is presumable that, for this reason, a base coat film durable to the shrinking force of the clear coat film as resulting from curing of the clear coating composition and volume change thereof due to solvent evaporation is formed and, as a result, the coating film acquires an improved finish appearance. Furthermore, the coating film formed shows excellent coating film performance characteristics (solvent resistance etc.). In addition, even when said pigmented base coat composition is applied again to the cured clear coat film for recoating, an improved adhesion between both the coating films can be observed.

The following examples are further illustrative of the present invention.

In the examples, "part(s)" and "%" are "part(s) by weight" and "% by weight", respectively.

Production Example 1

A reaction vessel was charged with 0.29 mole of isophthalic acid, 0.23 mole of phthalic acid, 0.43 mole hexahydrophthalic acid, 0.4 mole of trimethylolpropane, 0.6 mole of neopentyl glycol and 0.1 mole of coconut oil fatty acid and the condensation polymerization was carried out at 200°-230° C. to give a coconut oil-modified polyester resin with an acid value of 8 and a hydroxyl value of 72. A 60% resin solution (a-1) was prepared by adding 43 parts xylene to 100 parts of said polyester resin. Its viscosity was Y⁻ (25° C., Gardner bubble viscosity).

Production Example 2

An OH-containing acrylic resin solution (a-2) was prepared by reacting 30 parts of styrene, 40 parts of n-butyl methacrylate, 10 parts of 2-ethylhexyl acrylate, 18 parts of 2-hydroxyethyl acrylate and 2 parts of acrylic acid in an organic solvent composed of 85 parts of xylene and 15 parts of n-butanol. The number average molecular weight of the resin was 6,600, the resin solids content 50%, and the Gardner bubble viscosity J.

Production Example 3

An OH-containing acrylic resin solution (a-3) was prepared by reacting 30 parts of styrene, 30 parts of n-butyl methacrylate, 15 parts of 2-ethylhexyl acrylate and 25 parts of 2-hydroxyethyl acrylate in an organic solvent composed of 85 parts of xylene and 15 parts of n-butanol. The number average molecular weight was 5,000, the resin solids content 50%, and the Gardner bubble viscosity B.

Production Example 4

| Phenyltrimethoxysilane | 198 parts |
| Deionized water | 54 parts |
| 98% Sulfuric acid | 0.002 part |

The above materials were mixed up and subjected to reaction at 60° C. for 5 hours, the byproduct methanol was then distilled off under reduced pressure, and xylene was added to the remaining mixture to give a polyorganosiloxane solution (b-1) with a solids content of 50% and a Gardner viscosity of AB. The polyorganosiloxane obtained had a number average molecular weight of about 5,000 and had, on an average, 6 silanol groups per molecule.

Production Example 5

| Methyltrimethoxysilane | 136 parts |
| Diphenyldimethoxysilane | 182 parts |
| Deionized water | 90 parts |
| 60% Phosphoric acid | 1 part |

The above materials were mixed up and subjected to reaction at 60° C. for 10 hours, the byproduct methanol was distilled off under reduced pressure, and butyl acetate was added to the remaining mixture to give a polyorganosiloxane solution (b-2) with a solids content of 50% and a Gardner viscosity of D. The polyorganosiloxane obtained had a number average molecular weight of about 15,000 and had, on an average, 10 silanol groups per molecule.

Production Example 6

| Diphenyldimethoxysilane | 182 parts |
| B-(3,4-Epoxycyclohexyl)ethyl-trimethoxysilane | 186 parts |
| Deionized water | 108 parts |
| 60% Phosphoric acid | 1 part |

The above materials were mixed up and subjected to reaction at 60° C. for 15 hours, the byproduct methanol was then distilled off under reduced pressure, and butyl acetate was added to the remaining mixture to give a polyorganosiloxane solution (b-3) with a solids content of 50% and a Gardner viscosity of G. The polyorganosiloxane obtained had a number average molecular weight of about 2,000 and had, on an average, 10 silanol groups and 7 epoxy groups per molecule.

Production Example 7

| Phenyltrimethoxysilane | 198 parts |
| γ-Glycidoxypropyltrimethoxysilane | 236 parts |
| Deionized water | 108 parts |
| 60% Sulfuic acid | 0.1 part |

The above materials were mixed up and subjected to reaction at 60° C. for 10 hours, the byproduct methanol was distilled off under reduced pressure, and xylene was added to the remaining mixture to give a polyorganosiloxane solution (b-4) with a solids content of 50% and a Gardner viscosity of DE. The polyorganosiloxane obtained had a number average molecular weight of about 8,000 and had, on an average, 6 silanol groups and 20 epoxy groups per molecule.

Pigmented Base Coat Composition

Base Coat Composition 1

A mixture of 100 parts of the resin solution (a-1) obtained in Production Example 1 (60 parts as solids), 33.3 parts of U-Van 20SE (Note 1) (20 parts as solids), 40 parts of the polyorganosiloxane solution (b-1) obtained in Production Example 4 (20 parts as solids), 20 parts of an aluminum paste and 1 part of Reibo #3 (Note 2) was stirred and then a mixed solvent composed of Swazol #1000 (Note 3) and ethyl acetate (20/80 by weight) was added to adjust the viscosity of the coating composition to 15 seconds (Ford cup #4/20° C.). The coating composition thus prepared was subjected to testing.

(Note 1) U-Van 20SE, trademark of Mitsui Toatsu Chemicals, a butyl etherized melamine resin solution with a solids content of about 60%.

(Note 2) Reibo #3, trademark of Reibo Chemical, a silicone-based surface modifier solution (active ingredient content about 1%).

(Note 3) Swazol #1000, trademark of Cosmo Oil Co., a petroleum-derived aromatic solvent.

Base coat composition 2

Base coat composition 2 was prepared according to the same formulation as mentioned above for base coat composition 1 except that the polyorganosiloxane solution (b-2) was used in lieu of the polyorganosiloxane solution (b-1).

Base Coat Composition 3

Base coat composition 3 was prepared according to the same formulation as mentioned above for base coat composition 1 except that the polyorganosiloxane solution (b-3) was used in lieu of the polyorganosiloxane solution (b-1).

Base Coat Composition 4

Base coat composition 4 was prepared according to the same formulation as mentioned above for base coat composition 1 except that the polyorganosiloxane solution (b-4) was used in lieu of the polyorganosiloxane solution (b-1).

Base Coat Composition 5

A mixture of 112 parts of the resin solution (a-2) obtained in Production Example 2 (56 parts as solids), 40 parts of U-Van 20SE (24 parts as solids), 40 parts of the polyorganosiloxane solution (b-1) obtained in Production Example 4 (20 parts as solids), 20 parts of an aluminum paste and 1 part of Reibo #3 was stirred and then Swazol #1000 was added to adjust the viscosity of the coating composition to 15 seconds (Ford cup #4/20° C.). The resultant composition was subjected to testing.

Base Coat Composition 6

Base coat composition 6 was prepared according to the same formulation as mentioned above for base coat composition 5 except that the resin solution (a-3) was used in lieu of the resin solution (a-2).

Base Coat Composition 7

Base coat composition 7 was prepared according to the same formulation as mentioned above for base coat composition 5 except that the polyorganosiloxane solution (b-2) was used in lieu of the polyorganosiloxane solution (b-1).

Base Coat Composition 8

Base coat composition 8 was prepared according to the same formulation as mentioned above for base coat composition 5 except that the polyorganosiloxane solution (b-3) was used in lieu of the polyorganosiloxane solution (b-1).

Base Coat Composition 9

Base coat composition 9 was prepared according to the same formulation as mentioned above for base coat composition 5 except that the resin solution (a-3) was used in lieu of the resin solution (a-2) and that the polyorganosiloxane solution (b-3) was used in lieu of the polyorganosiloxane solution (b-1).

Base Coat Composition 10

Base coat composition 10 was prepared according to the same formulation as mentioned above for base coat composition 5 except that the polyorganosiloxane solution (b-4) was used in lieu of the polyorganosiioxane solution (b-1).

Base Coat Composition 11

Base coat composition 11 was prepared according to the same formulation as mentioned above for base coat composition 1 except that the polyorganosiloxane solution (b-1) was not used.

Base coat composition 12

Base coat composition 12 was prepared according to the same formulation as mentioned above for base coat composition 5 except that the polyorganosiloxane solution (b-1) was not used.

Production Example 8

| | |
|---|---|
| Methyltrimethoxysilane | 2,720 parts |
| γ-Methacryloxypropyltrimethoxysilane | 256 parts |
| Deionized water | 1,134 parts |
| 6% Hydrochloric acid | 2 parts |
| Hydroquinone | 1 part |

A mixture composed of the above materials was heated at 80° C. for 5 hours to give a macromonomer of the polysiloxane type. Said macromonomer had a number average molecular weight of 2,000 and had, on an average, one vinyl group (polymerizable unsaturated bond) and four hydroxyl groups per molecule. Using this polysiloxane macromonomer, a resin composition was prepared as follows.

| | |
|---|---|
| Polysiloxane macromonomer | 100 parts |
| 2-Hydroxyethyl acrylate | 100 parts |
| 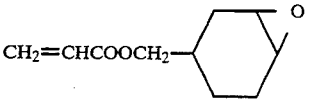 | 200 parts |
| 2-Ethylhexyl methacrylate | 500 parts |
| Styrene | 100 parts |
| Azobisisobutyronitrile | 50 parts |

A mixture composed of the above materials was added dropwise at 120° C. to 1,000 parts of a 1:1 (by weight) mixture of butanol and xylene to give a resin composition (c-1). The number average molecular weight of the resin obtained was about 10,000.

Production Example 9

| | |
|---|---|
| γ-Methacryloxypropyltrimethoxysilane | 100 parts |
| 2-Hydroxyethyl methacrylate | 100 parts |
| 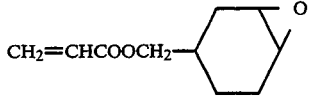 | 200 parts |
| 2-Ethylhexyl methacrylate | 500 parts |
| Styrene | 100 parts |
| Azobisisobutyronitrile | 50 parts |

A mixture composed of the above materials was added dropwise at 120° C. to 1,000 parts of a 1:1 (by weight) mixture of butanol and xylene to give a resin composition (c-2). The number average molecular weight of the resin was about 9,000.

Production Example 10

| | |
|---|---|
| Polysiloxane macromonomer (mentioned above) | 200 parts |
| 2-Hydroxyethyl acrylate | 100 parts |
| 2-Ethylhexyl methacrylate | 500 parts |
| Styrene | 200 parts |
| Azobisisobutyronitrile | 50 parts |

A mixture composed of the above materials was added dropwise at 120° C. to 1,000 parts of 1:1 (by weight) mixture of butanol and xylene to give a resin composition (c-3). The number average molecular weight of the resin was about 10,000.

Production Example 11

| | |
|---|---|
| γ-Methacryloxypropyltrimethoxysilane | 200 parts |
| 2-Hydroxyethyl methacrylate | 100 parts |
| 2-Ethylhexyl methacrylate | 500 parts |
| Styrene | 200 parts |
| Azobisisobutyronitrile | 50 parts |

A mixture composed of the above materials was added dropwise at 120° C. to 1,000 parts of a 1:1 (by weight) mixture of butanol and xylene to give a resin composition (c-4). The number average molecular weight of the resin was about 9,000.

Production Example 12

| | |
|---|---|
| 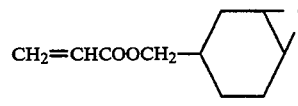 | 400 parts |
| 2-Hydroxyethyl methacrylate | 100 parts |
| 2-Ethylhexyl methacrylate | 400 parts |
| Styrene | 100 parts |

| | |
|---|---|
| -continued | |
| Azxobisisobutyronitrile | 50 parts |

A mixture composed of the above materials was added dropwise at 120° C. to 1,000 parts of a 1:1 (by weight) mixture of butanol and xylene to give a resin composition (c-5). The number average molecular weight of the resin was about 9,000.

Clear Top Coat Composition

Clear Top Coat Compositions 1 To 5

Five compositions were prepared according to the proportions (as solids) shown below in Table 1, followed by dilution with Swazol #1000 to a solids content of 50%.

TABLE 1

| | Clear top coat composition | | | | |
|---|---|---|---|---|---|
| Amount (parts) | 1 | 2 | 3 | 4 | 5 |
| Resin composition | | | | | |
| Species | C-1 | C-2 | C-3 | C-4 | C-4 |
| Amount | 100 | 100 | 50 | 50 | 70 |
| Species | | | C-5 | C-5 | |
| Amount | | | 50 | 50 | |
| Species | | | | | *1 |
| Amount | | | | | 30 |
| Catalyst | | | | | |
| Species | Aluminum tris(acetylacetonate) | | | | |
| Amount | 1.0 | | | | |

*1 Compound of the formula

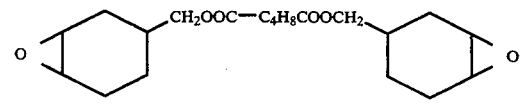

Examples 1 To 46 And Comparative Examples 1 And 2
Preparation of Coated Sheets

An epoxy resin-based cationic electrodeposition coating film (25 μm) was formed on dull steel sheets (after chemical conversion treatment) and, after curing thereof by heating at 170° C. for 30 minutes, Luga Bake AM (trademark of Kansai Paint Co., Ltd., an automotive coating composition of the polyester rein/melamine resin type) was applied to a film thickness of 30 μm (after drying) for intercoating, which was followed by 30 minutes of baking at 140° C. The coated surface of each sheet was subjected to wet sanding using a #400 sand paper and, after draining and drying, wiped using petroleum benzine, and used as a substrate.

Using the air spray coating technique, the pigmented base coat composition was applied and, three minutes thereafter, the clear top coat composition was immediately applied. The film thicknesses were 15 to 20 μm and 35 to 45 μm, respectively, after drying. Then, after 10 minutes of standing at room temperature, baking was carried out at 140° C. for 30 minutes. In recoatability testing, the baking was carried out at 160° C. for 30 minutes and the recoat layer was baked at 120° C. for 30 minutes. Typical performance characteristics and the appearance of each coating film thus obtained are shown in Table 2.

TABLE 2

| | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Pigmented base | 1 | 1 | 1 | 1 | 1 | 2 | 2 | 2 | 2 | 2 | 3 | 3 | 3 | 3 | 3 | 4 |

TABLE 2-continued

| coat composition | | | | | | | | | | | | | | | | | |
|---|---|---|---|---|---|---|---|---|---|---|---|---|---|---|---|---|---|
| Clear top coat composition | | 1 | 2 | 3 | 4 | 5 | 1 | 2 | 3 | 4 | 5 | 1 | 2 | 3 | 4 | 5 | 1 |
| Appearance (*1) | | A | A | A | A | A | A | A | A | A | A | A | A | A | A | A | A |
| Image clarity (*2) | | 79 | 80 | 77 | 78 | 77 | 79 | 80 | 78 | 77 | 77 | 83 | 83 | 82 | 81 | 81 | 86 |
| Metallic tone (*3) | | A | A | A | A | A | A | A | A | A | A | A | A | A | A | A | A |
| Water resistance (*4) | | A | A | A | A | A | A | A | A | A | A | A | A | A | A | A | A |
| Recoatability (*5) | | A | A | A | A | A | A | A | A | A | A | A | A | A | A | A | A |
| Solvent resistance (*6) | Coating film condition | C | C | C | C | C | | | | | | B | B | | | | B |
| | Coating film hardness | 2B/H | 2B/H | 2B/H | 2B/H | | | | | | | B/H | B/H | | | | B/H |

| | | Example | | | | | | | | | | | | | | |
|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 | 32 |
| Pigmented base coat composition | | 4 | 4 | 4 | 4 | 5 | 5 | 5 | 5 | 5 | 6 | 7 | 7 | 7 | 7 | 7 | 8 |
| Clear top coat composition | | 2 | 3 | 4 | 5 | 1 | 2 | 3 | 4 | 5 | 1 | 1 | 2 | 3 | 4 | 5 | 1 |
| Appearance (*1) | | A | A | A | A | A | A | A | A | A | A | A | A | A | A | A | A |
| Image clarity (*2) | | 88 | 85 | 85 | 84 | 78 | 78 | 77 | 76 | 77 | 74 | 78 | 79 | 76 | 76 | 75 | 82 |
| Metallic tone (*3) | | A | A | A | A | A | A | A | A | A | A | A | A | A | A | A | A |
| Water resistance (*4) | | A | A | A | A | A | A | A | A | A | A | A | A | A | A | A | A |
| Recoatability (*5) | | A | A | A | A | A | A | A | A | A | A | A | A | A | A | A | A |
| Solvent resistance (*6) | Coating film condition | B | | | | C | C | | | | | | | | | | |
| | Coating film hardness | B/H | | | | 2B/H | 2B/H | | | | | | | | | | |

| | | Example | | | | | | | | | | | | | Comparative Example | |
|---|---|---|---|---|---|---|---|---|---|---|---|---|---|---|---|---|---|
| | | 33 | 34 | 35 | 36 | 37 | 38 | 39 | 40 | 41 | 42 | 43 | 44 | 45 | 46 | 1 | 2 |
| Pigmented base coat composition | | 8 | 8 | 8 | 8 | 9 | 9 | 9 | 9 | 9 | 10 | 10 | 10 | 10 | 10 | 15 | 16 |
| Clear top coat composition | | 2 | 3 | 4 | 5 | 1 | 2 | 3 | 4 | 5 | 1 | 2 | 3 | 4 | 5 | 1 | 1 |
| Appearance (*1) | | A | A | A | A | A | A | A | A | A | A | A | A | A | A | C | C |
| Image clarity (*2) | | 82 | 80 | 81 | 80 | 82 | 83 | 81 | 80 | 80 | 83 | 84 | 82 | 82 | 81 | 38 | 36 |
| Metallic tone (*3) | | A | A | A | A | A | A | A | A | A | A | A | A | A | A | B | B |
| Water resistance (*4) | | A | A | A | A | A | A | A | A | A | A | A | A | A | A | B | B |
| Recoatability (*5) | | A | A | A | A | A | A | A | A | A | A | A | A | A | A | C | C |
| Solvent resistance (*6) | Coating film condition | | | | | | | | | | B | B | | | | E | E |
| | Coating film hardness | | | | | | | | | | B/H | B/H | | | | 5B/H | 6B/H |

TABLE 2-continued

Ness

Test methods (*1) Appearance: Coating films were examined for ebullition and shrinkage. A: no abnormalities; B: some abnormalities observable; C: many abnormalities observable.
(*2) Image clarity: An image clarity meter (ICM; Suga Shikenki Co.) was used. The numerical values in Table 2 are ICM values which can range from 0 to 100%. A higher value indicates a higher degree of image clarity and ICM values of not less than 74 are indices of very good image clarity.
(*3) Metallic tone: Coating films were looked at frontways and evaluated for metallic glitters and white reflection by the eye. A: glitters and white reflection; B: no glitters and poor white reflection; C: no glitters and no white reflection.
(*4) Water resistance: Coated sheet specimens were immersed in warm water maintained at 40° C. for 240 hours and then evaluated for blisters by the eye. A: no abnormalities; B: some abnormalities; C: many abnormalities.
(*5) Recoatability: The same base coat composition and clear coat composition as used in each example or comparative example were reapplied to the coated surface and baked at 120° C. for 30 minutes. The coating film obtained was cut crosswise with a cutting knife, an adhesive cellophane tape was applied to the coated surface and peeled off abruptly, and the adhesion between the first coating film and second coating film (clear coating film/base coating film) was evaluated. A: no peeling; B: slight extent of peeling; C: remarkable extent of peeling.
(*6) Solvent resistance: Specimens were immersed in Nisseki Silver gasoline (trademark of Nippon Oil Co.) for 1 day and then exmained for the state and hardness of coating films. State of coating film: A: no abnormalities; B: very slight extent of shrinkage; C: some extent of shrinkage; D: shrinkage; E: marked extent of shrinkage. Coating film hardness: Pencil hardness after immersion/pencil hardness before immersion.

Test Methods (*1) Appearance: Coating films were examined for ebullition and shrinkage. A: no abnormalities; B: some abnormalities observable; C: many abnormalities observable.

(*2) Image clarity: An image clarity meter (ICM; Suga Shikenki Co.) was used. The numerical values in Table 2 are ICM values which can range from 0 to 100%. A higher value indicates a higher degree of image clarity and ICM values of not less than 74 are indices of very good image clarity.

(*3) Metallic tone: Coating films were looked at frontways and evaluated for metallic glitters and white reflection by the eye. A: glitters and white reflection; B: no glitters and poor white reflection; C: no glitters and no white reflection.

(*4) Water resistance: Coated sheet specimens were immersed in warm water maintained at 40° C. for 240 hours and then evaluated for blisters by the eye. A: no abnormalities; B: some abnormalities; C: many abnormalities.

(*5) Recoatability: The same base coat composition and clear coat composition as used in each example or comparative example were reapplied to the coated surface and baked at 120° C. for 30 minutes. The coating film obtained was cut crosswise with a cutting knife, an adhesive cellophane tape was applied to the coated surface and peeled off abruptly, and the adhesion between the first coating film and second coating film (clear coating film/base coating film) was evaluated. A: no peeling; B: slight extent of peeling; C: remarkable extent of peeling.

(*6) Solvent resistance: Specimens were immersed in Nisseki Silver gasoline (trademark of Nippon Oil, Co.) for 1 day and then examined for the state and hardness of coating films.

State of coating film: A: no abnormalities; B: very slight extent of shrinkage; C: some extent of shrinkage; D: shrinkage; E: marked extent of shrinkage.

Coating film hardness: Pencil hardness after immersion/pencil hardness before immersion.

We claim:

1. A method of forming a coating film by forming in sequence a pigmented base coat and a clear top coat on a substrate followed by finishing by the two-coat one-bake technique, the method being characterized by using, as a coating composition for pigmented base coat formation, an organic solvent-based coating composition comprising, (1) an OH-containing resin,
(2) an amino resin,
(3) a crosslinking agent which has, on an average, at least two groups, per molecule, each selected from the group consisting of a silanol group and an alkoxysilane group and which has a number average molecular weight of at least 1,000, said crosslinking agent being (A) or (B) as defined below;

(A) a polyorganosiloxane which is prepared by subjecting silane compound(s) comprising not less than 30% by weight, based on the total weight of silane compound, of trifunctional silane of the general formula $$R^1_x Si(OR^2)_{4-x} \quad (I)$$

wherein $R^1$ and $R^2$ may be the same or different and each is a hydrocarbon group containing 1 to 13 carbon atoms and x is 1, to hydrolysis condensation, (B) an epoxy-containing polyorganosiloxane which is prepared by subjecting to hydrolysis cocondensation a silane represented by the general formula (I) wherein x is 1, 2 or 3 and an epoxy-containing silane of the general formula $$G-\underset{(R^4)_{y-1}}{Si(OR^3)_{4-y}} \quad (II)$$

wherein $R^3$ and $R^4$ may be the same or different and each is a hydrocarbon group containing 1 to 13 carbon atoms, y is 1, 2 or 3, G is a group of the formula (III) or (IV) given below:

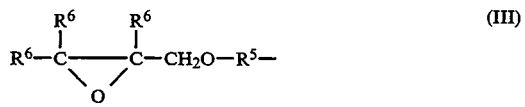

(III)

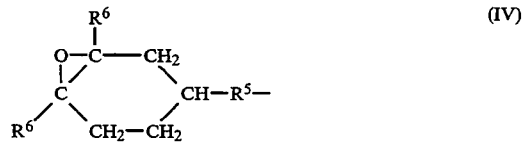

(IV)

wherein $R^5$ is a bivalent hydrocarbon group containing 1 to 13 carbon atoms and the $R^6$ groups may be the same or different and each is a hydrogen atom or a methyl group, providing that the silane of formula (I) in which x is 1 and the silane of formula (II) in which y is 1 combinedly account for not less than 30% by weight in the total weight of the hydrolyzed silane compounds, (4) a flaky metal powder and/or a mica powder, and
(5) an organic solvent, and using, as a coating composition for clear top coat formation, a composition comprising, (1) a base resin, wherein the base resin is (i) a resin mixture comprising three component resins comprising (a) an OH-containing resin, (b) an epoxy-containing resin and (c) a resin containing one or more groups each selected from the group consisting of a silanol group and a hydrolyzable group bound directly to a silicon atom, (ii) a resin mixture comprising two component resins comprising (a) an epoxy-containing resin and (b) a resin containing one or more groups each selected from the group consisting of a silanol group and a hydrolyzable group bound directly to a silicon atom, either one or both of the resins being OH-containing resins, or (iii) an OH- and epoxy-containing base resin which further contains at least one group selected from the group consisting of a silanol group and a hydrolyzable group bound directly to a silicon atom, (2) a curing catalyst, and (3) an organic solvent.

2. A method of forming a coating film as claimed in claim 1, wherein the OH-containing resin contained in the pigmented base coat composition is an OH-containing polyester resin or an OH-containing vinyl resin.

3. A method of forming a coating film as claimed in claim 1, wherein the crosslinking agent contained in the pigmented base coat composition further contains, on an average, at least one epoxy group per molecule.

4. A method of forming a coating film as claimed in claim 1, wherein, in the pigmented base coat composition, the proportions of the OH-containing resin, amino resin and crosslinking agent are 5 to 90% by weight, 5 to 50% by weight and 1 to 40% by weight, respectively, based on the total amount (resin solids) of the OH-containing resin, amino resin and crosslinking agent.

5. A method of forming a coating film as claimed in claim 1, wherein, the base resin contained in the clear top coat composition is (i) a resin mixture comprising three component resins, comprising (a) an OH-containing resin (b) an epoxy-containing resin and a (c) resin containing one or more groups each selected from the group consisting of a silanol group and a hydrolyzable group bound directly to a silicon atom.

6. A method of forming a coating film as claimed in claim 1, wherein, in the clear top coat composition, the proportion of the curing catalyst is 0.01 to 30 parts by weight per 100 parts by weight of the base resin.

7. The method of claim 1, wherein the base resin contained in the clear top coat composition is a resin mixture comprising (a) an epoxy-containing resin and (b) a resin containing one or more groups selected from the group consisting of a silanol group and a hydrolyzable group bound directly to a silicon atom, with at least one of the resins containing at least one —OH group.

8. The method of claim 1, wherein the base resin contained in the clear top coat composition comprises an —OH and epoxy-containing resin which further contains one or more groups selected from the group consisting of a silanol group and a hydrolyzable group bound directly to a silicon atom.

* * * * *